Figure 1:
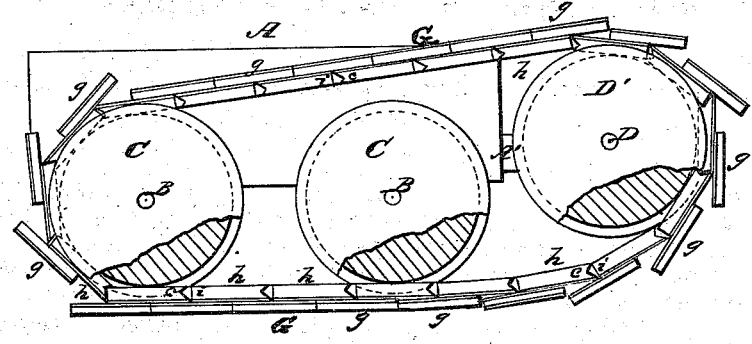
Figure 2:
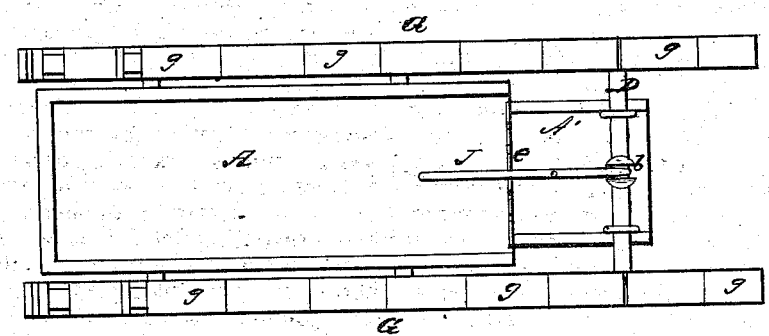
Figures 4, 5:
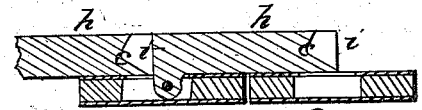
Figure 3:
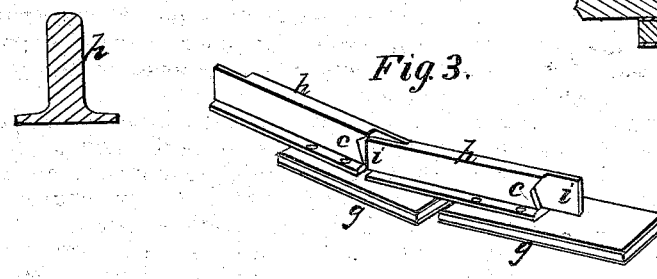

C. V. B. REEDER.
Traction-Vehicles.

No. 154,519.  Patented Aug. 25, 1874.

WITNESSES  
Robert Everett.  
Geo. E. Upham.

INVENTOR  
C. V. B. Reeder  
BY Chipman Hosmer & Co  
ATTORNEY

THE GRAPHIC CO. PHOTO-LITH. 39 & 41 PARK PLACE, N.Y.

UNITED STATES PATENT OFFICE.

CLINTON V. B. REEDER, OF SAN JOSÉ, CALIFORNIA.

IMPROVEMENT IN TRACTION-VEHICLES.

Specification forming part of Letters Patent No. 154,519, dated August 25, 1874; application filed April 11, 1874.

*To all whom it may concern:*

Be it known that I, CLINTON V. B. REEDER, of San José, in the county of Santa Clara and State of California, have invented a new and valuable Improvement in Endless-Track Prairie-Cars; and I do hereby declare that the following is a full, clear, and exact description of the construction and operation of the same, reference being had to the annexed drawings making a part of this specification, and to the letters and figures of reference marked thereon.

This invention has relation to wagons which are designed for use on prairies for general transportation, and for drawing plows and other agricultural implements or machines, and which are provided with endless rotating tracks presenting broad treads and powerful traction. The nature of my invention consists, mainly, in a wagon, the wheels of which are mounted upon endless rotating tracks, which are, respectively, composed of short sections or shoes jointed together in a novel manner, said tracks being carried around driving-wheels, which also serve as guiding-wheels, and which are driven by a steam-engine or any other suitable motive power, located in the wagon-body, all as will be hereinafter explained.

In the annexed drawings, A designates the body of the wagon, which is mounted on the axles B of four transporting wheels, C. At the front end of the wagon-body an extension, A', is formed, transversely across which extends a shaft, D, which is mounted in suitable bearings and provided with grooved pulleys D' on its ends. The shaft D is adjustable endwise, and it can be so adjusted by means of a lever, J, the front end of which enters an annular groove in a hub, $b$, and the rear end extends back and over a notched plate or rack, $c$, to which the lever J can be fixed when it is properly adjusted.

This adjustment of the pulleys D' and their shaft is for the purpose of guiding the wagon and turning it. Motion will be transmitted to the shaft D from an engine mounted on the wagon in any suitable manner.

G G designate endless tracks, which are applied around the wheels C C and pulley D' on each side of the wagon. It is on this track that the wagon is supported, and by means of which the wagon is transported. Each endless track G is composed of short sections or shoes $g$, which may be of any suitable width, their bottom surfaces or soles being suitably shod with metal to protect them from rapid wear, and if desired roughened to prevent slipping. These sections or shoes $g$ are rigidly secured to ribs $h$, which, in cross-section, are T-shaped. The ends of these ribs $h$ are constructed with lapping portions $i$, formed by removing one-half of the vertical rib, at the inner terminus of which portions angular shoulders $c$ are formed. When the ribs $h$ are connected together by means of pivots $f$ a flexible endless track is formed, which constitutes an endless revolving tread operating by traction nearly the full length of the wagon, and preventing by the large area of impinging surface on the ground to move the wagon and to prevent sinking into soft yielding soil. The joints of the ribs $h$ are located at the middle of the length of the shoes $g$, and as these joints flex in turning around the wheels the portions $i\ i$ slide freely against each other. These lapping portions $i\ i$ of the ribs prevent undue lateral flexure of the tracks, and consequently keep the several sections composing the same in proper position to run truly in the grooves of the wheels and pulleys.

In practice, I shall employ driving and guiding pulleys D' at both ends of the wagon-body to facilitate guiding and turning.

I am well aware that an endless traction-belt forming an endless track is not new, and also that an endless track with wheels and driving and guiding pulleys is not new, and therefore I do not claim such invention broadly; but

What I claim as new, and desire to secure by Letters Patent, is—

1. The continuous and laterally-adjustable axle D, with the driving and guiding pulleys D' and the horizontally vibrating lever J, in combination with the endless sectional track G, as and for the purposes set forth.

2. The hub $b$, with its annular notch to receive the end of lever J, applied upon the continuous and endwise-movable axle D, in combination with lever J, substantially as set forth.

3. The combination of the ribs $h$, jointed together and lapped, and having shoulders $c$, as set forth.

In testimony that I claim the above I have hereunto subscribed my name in the presence of two witnesses.

CLINTON VAN BUREN REEDER.

Witnesses:
   J. N. SPENCER,
   JOHN T. COLAHAN.